(12) United States Patent
Sugiura et al.

(10) Patent No.: US 6,459,493 B1
(45) Date of Patent: Oct. 1, 2002

(54) APPARATUS FOR MEASURING SURFACE FORM

(75) Inventors: Minako Sugiura, Tokyo; Shigeo Kubota, Kanagawa; Naoya Eguchi, Tokyo, all of (JP)

(73) Assignee: Sony Corporation, Tokyo (JP)

( * ) Notice: Subject to any disclaimer, the term of this patent is extended or adjusted under 35 U.S.C. 154(b) by 985 days.

(21) Appl. No.: 08/663,742

(22) Filed: Jun. 14, 1996

(30) Foreign Application Priority Data

Jun. 16, 1995 (JP) .............................................. 7-150037

(51) Int. Cl.[7] .............................................. G01B 11/24
(52) U.S. Cl. ...................................................... 356/630
(58) Field of Search ................................ 356/376, 1, 4, 356/375, 371; 250/214 B, 214 C; 73/146; 359/206

(56) References Cited

U.S. PATENT DOCUMENTS

| | | | |
|---|---|---|---|
| 4,474,422 A | * 10/1984 | Kitamura | 350/6 |
| 4,548,504 A | * 10/1985 | Morander | 356/375 |
| 4,639,140 A | * 1/1987 | Lerat | 356/376 |
| 4,739,507 A | * 4/1988 | Byer et al. | 372/22 |
| 4,878,754 A | * 11/1989 | Homma et al. | 356/376 |
| 5,088,828 A | * 2/1992 | Doemens et al. | 356/376 |
| 5,130,844 A | * 7/1992 | Okazaki | 359/328 |
| 5,175,741 A | * 12/1992 | Okazaki | 372/75 |
| 5,307,152 A | * 4/1994 | Boehnlein et al. | 356/376 |
| 5,392,110 A | * 2/1995 | Yojima et al. | 356/1 |
| 5,557,446 A | * 9/1996 | Kato | 359/206 |

* cited by examiner

Primary Examiner—Michael P. Stafira
(74) Attorney, Agent, or Firm—Sonnenschein, Nath & Rosenthal

(57) ABSTRACT

A second harmonic generating element radiates a laser beam having a wavelength of 532 nm onto a substrate surface. The laser beam corresponds to the second harmonic beam of a fundamental laser beam having a wavelength of 1064 nm. An emitting optical system emits the laser beam vertically to the substrate surface so that the laser beam is made linear. An observing means has a optical axis Lo oriented in a different direction from a optical axis Li of the emitting optical system and provides a CCD image sensor served as a two-dimensional imaging device located in conjugation with the height or thickness of the substrate surface. The observing means operates to observe a light section image formed by the linear beam fired by the emitting optical system onto the substrate surface. Then, an image processing means precisely measures the form of the surface of an object to be measured as suppressing degrade of an S/N ratio, on the basis of the image data of the light section image observed by the observing means.

16 Claims, 6 Drawing Sheets

APPARATUS FOR MEASURING SURFACE FORM

BACKGROUND OF THE INVENTION

1. Field of the Invention

The present invention relates to an apparatus for measuring a form of a surface. More particularly, the present invention relates to a measuring apparatus that operates to measure a form of a surface of an object according to the light reflected off the surface of the object.

2. Description of the Prior Art

With miniaturization and sophistication of electronic instruments such as, for example, a camcoder and a wide screen TV set, attention has been paid to the high-density mounting of electronic components. Accordingly, it is likely that more precise measurement of the thickness of cream solder coated on a circuit board or the inspection for a state of mounted components will be required.

For example, in order to inspect the thickness of a solder layer immediately after the cream solder is coated, a laser diode or a He—Ne laser operates to radiate a laser beam having a wavelength of 630 to 810 nm onto an object on which the solder is coated and to sense the beam reflected from the solder-coated object using an image sensor or a location sensor which employs a CCD (Charged Coupled Device).

This type of apparatus for measuring the form of a surface such as the apparatus for measuring a thickness of solder has been conventionally arranged as shown in FIG. 1, for example. The apparatus 50 for measuring a surface form operates as follows. A laser source 51 emitts a diffused laser beam having a wavelength of 632.8 to 830 nm. The diffused laser beam passes through a collimator lens 52 so that the laser beam is transformed into a parallel laser beam. The parallel laser beam passes through a concave cylindrical lens 53 and a convex cylindrical lens 54 so that the parallel laser beam is linearly radiated onto a surface 55 of an object to be measured while keeping the beam perpendicular to the surface 55. The beam is reflected on the surface 55 obliquely to an optical axis of an illuminating optical system comprised of a collimator lens 52, a concave cylindrical lens 53, and a convex cylindrical lens 54. The reflected beam is incident on a CCD image sensor 57 at right angles through an imaging lens 56. The CCD image sensor 57 corresponds to a two-dimensional image sensor. The CCD image sensor 57 receives the reflected beam and senses a form of emission lines appearing according to the form of the surface 55.

The data about the sensed form is read by a computer dedicated to processing graphics. This type of computer uses a triangulation survey at one point to be measured and two measuring points located differently so that the computer can determine the form of the surface of the object to be measured from the coordinates of the point to be measured, a distance between the measuring points, and a visual angle.

For sensing the form of emission lines appearing according to the form of the surface of the object to be measured, the apparatus 50 is arranged to locate the CCD image sensor 57 perpendicularly to the optical axis of the reflected beam and obliquely to the optical axis of the laser beam radiated onto the object 55.

On the CCD image sensor 57, a light section image is magnified too much by bringing about a change of width of the laser beam resulting from variable heights of the object surface 55 spaced from a datum level, that is, the variable thicknesses of the surface 55 in concert with a defocusing resulting from images on the sensor 57 located differently from each other. In the apparatus 50, therefore, the signal intensity of the light section image is so variable on the object surface according to the variety of the surface thickness. This variety makes the S/N ratio worse and the measuring resolution lower, which become the obstacle to precise operation, thereby making it difficult to exactly measure the form of the object surface.

Further, in case that the apparatus 50 operates to measure a thickness of the coat of the cream solder, the apparatus 50 cannot offer the highly reliable measurement of the object surface, since a resist plane adjacent for the solder coat is set as the datum level.

This is because the laser beam having a wavelength of 632.8 to 830 nm emitted from the laser source 51 has a greatly different reflectance for the resist component than the reflectance of the solder. FIG. 2 is a graph showing a spectral characteristic for reflectance with respect to the resist component. The laser beam having the above-mentioned wavelength has a reflectance of 0.5% or less for the resist component, while the laser beam has a reflectance of about 70% for the solder portion. The latter is 100 or more times as large as the former. Hence, if a video signal in the solder portion is adjusted not to be saturated, the difference in video signal intensity becomes too much large between the resist portion and the solder portion. This difference makes the S/N ratio worse, which inhibits the precise sensing of video signals in the resist portion, thereby making it difficult to measure the object surface with high reliance.

If the laser beam is condensed linearly, the line width of the resist portion is greatly different from that of the solder portion. This makes a measuring accuracy worse.

SUMMARY OF THE INVENTION

According to an aspect of the invention, an apparatus for measuring a surface form includes an emitting optical system for radiating a beam linearly from a light source onto a surface of an object to be measured, an observing system having a optical axis directed differently from the optical axis of the emitting optical system, and a two-dimensional image sensor located to be in conjugation with the height direction of the object to be measured, that is, the direction of the optical axis of the emitting optical system, for observing a light section image formed by the linear beam radiated onto the surface of the object to be measured. Hence, this measuring apparatus suppresses defocusing even at a location spaced from the center of the image and lower a line width of the light section image and change of a light intensity as compared with the prior art, thereby keeping the measurement more exact with no degrade of the S/N ratio. Further, since the reflectance against the resist portion is made larger as compared with the prior art, the video signal of the resist portion is made larger so that the distribution of the intensity may be sensed at a high S/N ratio. This makes the measurement of the surface form more reliable and it possible to exactly measure the surface form of a mounting substrate. Moreover, unlike the prior art, the measuring apparatus uses a visible laser beam. Hence, the apparatus does not need a reference light, which results in decreasing the number of parts and reducing the overall apparatus in size.

According to another aspect of the invention, an apparatus for measuring a surface form includes an emitting optical system for obliquely radiating the linear beam from a light source onto the surface of the object to be measured and an observing system having a two-dimensional image sensor located perpendicularly to the surface of the object to be measured, for observing a light section image formed by the linear beam applied onto the object surface. As compared with the prior art, the line width of the light section image and the change of the intensity distribution are far less variable. This makes it possible to keep the S/N ratio high in sensing the image, thereby enhancing the reliance of measuring the surface form and being able to more exactly measure the surface form of the mounting substrate.

DESCRIPTION OF THE PREFERRED EMBODIMENTS

The preferred embodiments of an apparatus for measuring a surface form according to the present invention will be described with reference to FIGS. 3 through 10 below. A first embodiment of the invention relates to an apparatus for measuring a thickness of solder. This apparatus operates to radiate a laser beam onto a surface of a substrate on which cream solder is coated and measure a thickness of the solder according to the change of the laser beam reflected on the substrate surface.

Figure 3:
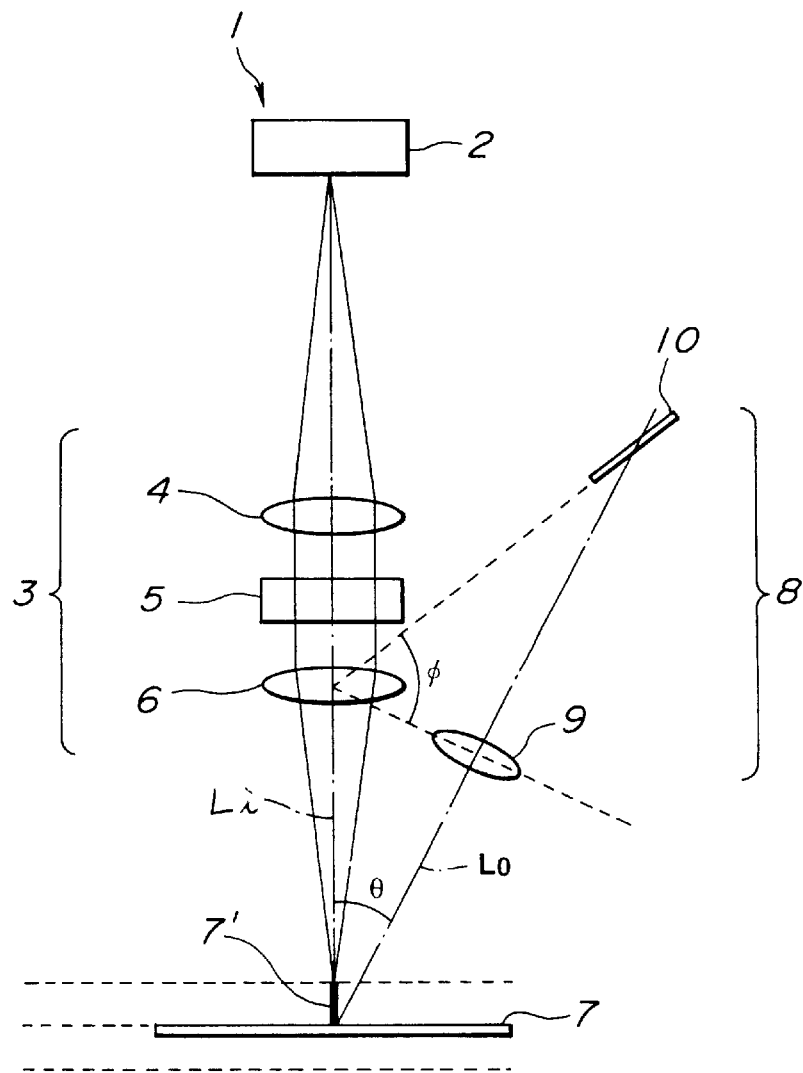
FIG. 3 is a schematic diagram showing an apparatus for measuring a thickness of solder according to a first embodiment of an apparatus for measuring a surface form of the present invention.

As shown in FIG. 3, the apparatus 1 for measuring a thickness of solder includes a second harmonic generating element 2 for applying a laser beam having a wavelength of 532 nm to the surface 7 of the substrate, the laser beam serving as a second harmonic beam of a fundamental laser beam having a wavelength of 1064 nm, an emitting optical system 3 for linearly radiating the laser beam from the second harmonic generating element 2 onto the substrate surface 7 at right angles, a CCD (Charge Coupled Device) image sensor 10 which is a two-dimensional image sensor and has a optical axis Lo in the different direction from the optical axis Li of the emitting optical system 3 and is located to be in conjugation with the height direction (thickness) of the substrate surface 7, an observing system 8 for observing a light section image formed by the linear beam emitted onto the substrate surface 7 by the emitting optical system 3, and an image processing system for converting image data of the light section image observed by the observing system 8 into a video signal.

The emitting optical system 3 is arranged to have a collimator lens 4 for transforming the laser beam emitted from the second harmonic generating element 2 into a parallel beam, a cylindrical lens 5 for magnifying the parallel beam passed through the collimeter lens 4 in one direction, and a condensing lens 6 for magnifying the parallel beam on the substrate surface 7 in one direction and condensing on the substrate surface 7 the parallel beam in the direction perpendicular to the former direction. FIG. 3 is a diagram showing the apparatus for measuring a thickness of solder as viewed in the direction perpendicular to the former direction.

The observing system 8 is comprised of an imaging lens 9 having an operating distance of 30 to 50 mm and a magnification of 1 at which the laser beam reflected on the substrate surface 7 is imaged on the CCD image sensor 10 and a ⅔-sized CCD image sensor 10.

Figure 1:
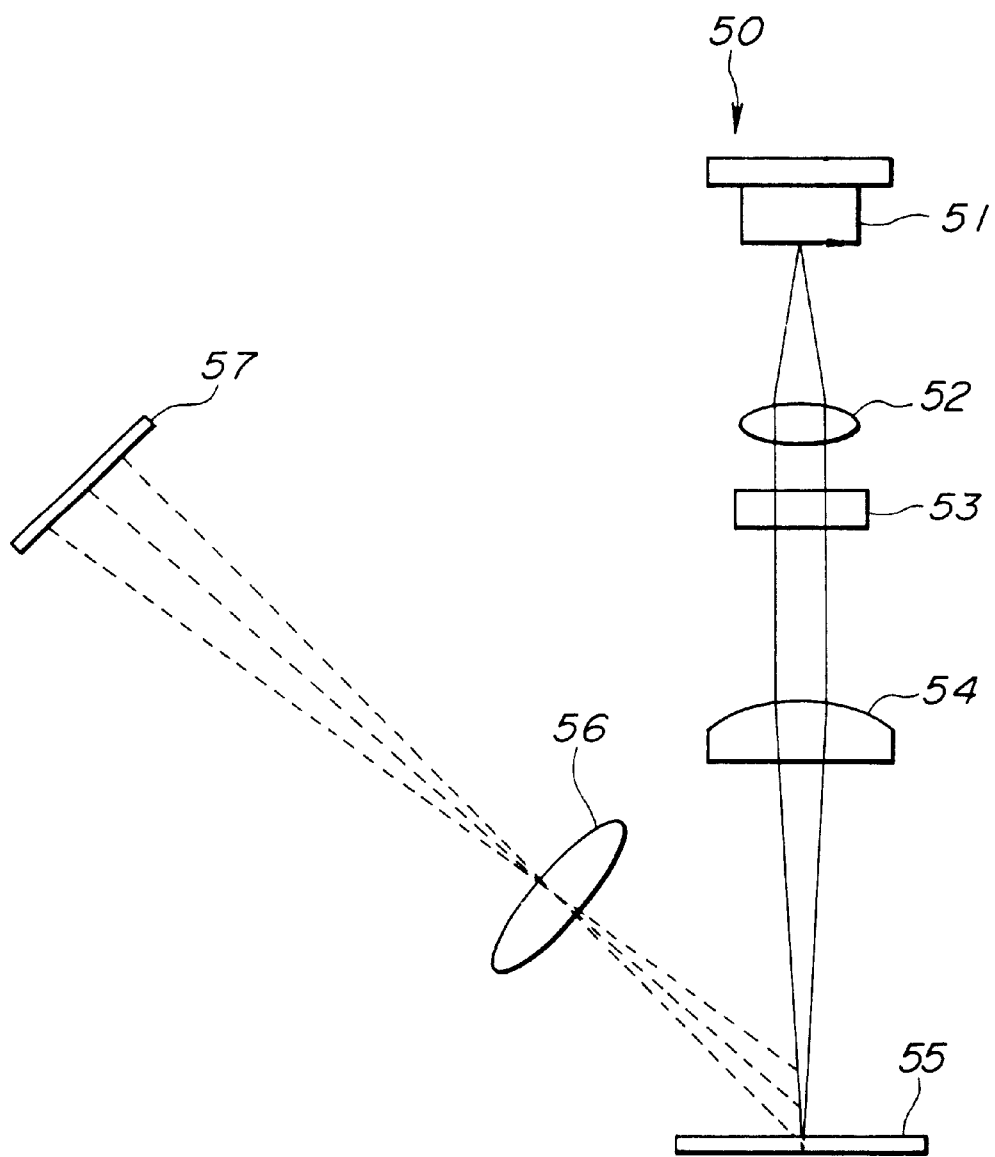
FIG. 1 is a schematic diagram showing a conventional apparatus for measuring a surface form.
Figure 2:
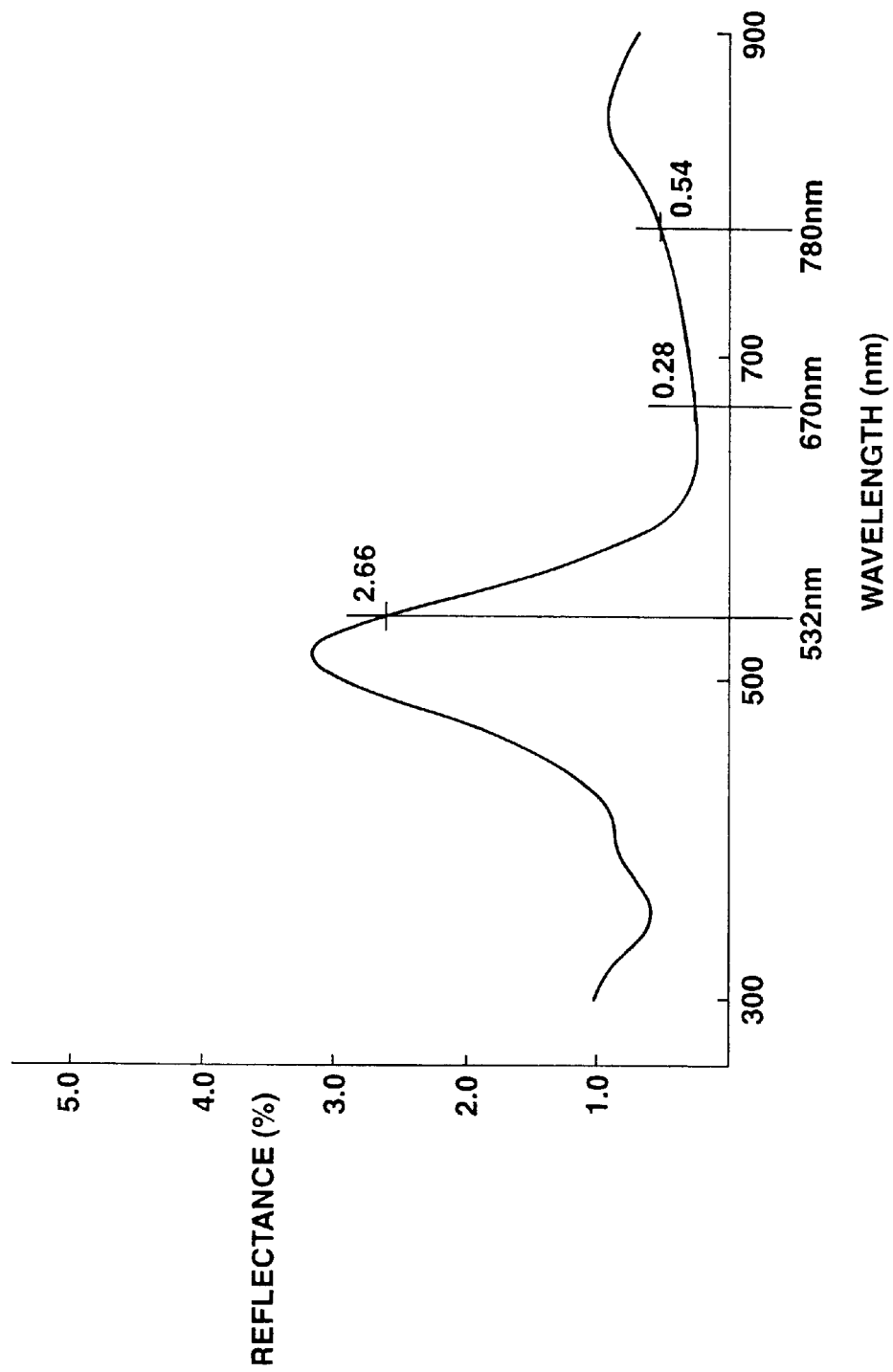
FIG. 2 is a graph showing a spectral characteristic to a reflectance to a resist portion.
Figure 4:
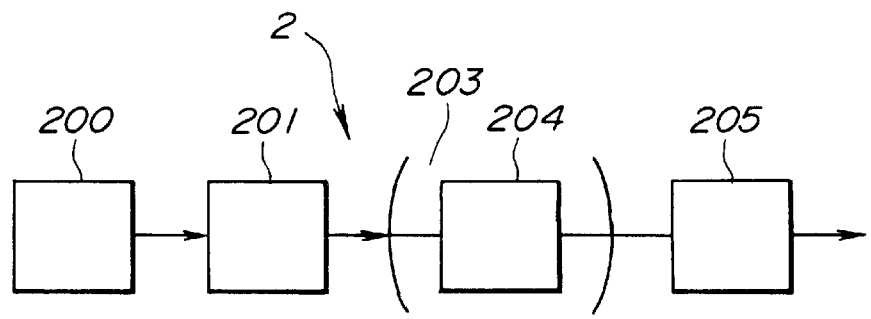
FIG. 4 is a model view describing an arrangement of a second harmonic generating element 2 served as a light source provided in the apparatus for measuring a thickness of solder.

The arrangement of the second harmonic generating element 2 will be described with reference to FIG. 4. The excited beam having a wavelength of 810 nm emitted from a semiconductor laser 200 is radiated onto an Nd:YAG laser or an Nd:YVO4 laser, each of which is a solid laser 201. The Nd:YAG or Nd:YVO4 laser operates to generate a fundamental wave having a wavelength of 1064 nm and apply it to a nonlinear optical crystalline element 204 like a KTP in a resonator structure 203. Through the element 204, the fundamental wave is transformed into the second harmonic laser. The laser beam having a wavelength of 532 nm emitted from the second harmonic generating element 2 has the following reflectance with respect to the resist portion: It is about 2.66% that is about 83% of a maximum value 3.2% as shown in FIG. 2. This is larger by about 20 dB than the reflectance of the laser beam having a wavelength of 632.8 to 830 nm with respect to the resist portion. Hence, the intensity of the beam reflected on the resist plane is improved by about 20 dB. This improvement makes it possible to sense the reflected beam on the overall substrate surface, thereby being able to measure a thickness of solder on the level of the resist plane.

In the second harmonic generating element 2, a beam expander 205 is provided. The beam expander 205 operates to diffuse the laser beam having a wavelength of 532 nm. The diffused laser beam is transformed into a parallel beam. Then, the parallel laser beam passes through the cylindrical lens 5 and the condensing lens 6, and is turned to be a linear laser beam having a numerical aperture (NA) of about 0.020, a focal depth of about 665 $\mu$m, a line width of 30 to 160 $\mu$m in the range of ±4 mm from a condensing point in the direction of the optical axis, and a line length of 9 to 10 mm. The quantity of the laser beam radiated onto the substrate surface 7 is lengthwise 50 $\mu$W /mm for each line width of 30 $\mu$m. The laser beam reflected on the substrate surface 7 is imaged on the CCD image sensor 10 by the imaging lens 9. The optical axis Lo of the observing system 8 keeps an angle of 45 degrees with respect to the optical axis Li of the emitting optical system 3.

Figure 5:
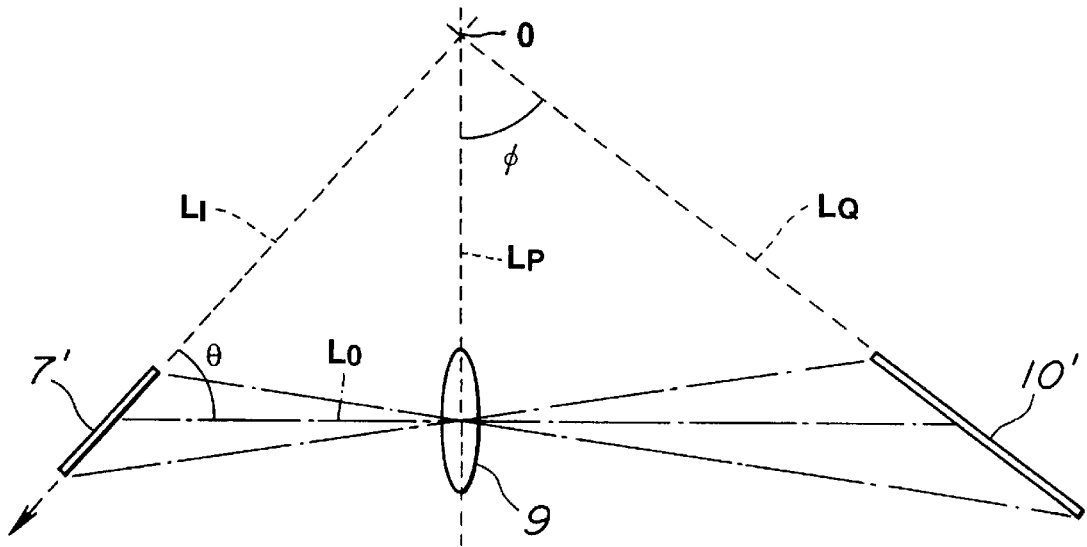
FIG. 5 is a model view describing location of an observing system in the apparatus for, measuring a thickness of solder.

The location of the observing system 8 will be described with reference to FIG. 5. The optical axis Lo of the lens is inclined in a manner to make an extending line Lp of a lens plane perpendicular to the optical axis Lo of the imaging lens 9 pass through a crosspoint O between an extending line (that is the same as the optical axis Li) of the object surface 7' in the height direction of the substrate surface 7 as viewed on the drawing paper and an extending line Lo of an image surface 10' on the CCD image sensor 10. As a result of this inclination, the object surface 7' is in conjugation with the image surface 10', so that the overall object surface 7' is in focus.

At that time, among an angle θ formed between the lens optical axis Lo of the imaging lens 9 and the object surface 7', an angle Φ formed between an extending line $L_Q$ of the image surface 10' and the extending line $L_P$ of the lens surface of the imaging lens 9, and a magnification M of the imaging lens 9, the following relation is established:

$$TAN\ \theta = M/TAN\ \phi$$

This kind of relation is, in general, called the rule of Scheimpflug.

The solder measuring apparatus 1 according to the first embodiment is arranged so that the object surface 7' is located in the direction of the optical axis Li of the emitting optical system 3, that is, in the direction of the height (thickness) of the substrate surface 7 corresponding to the surface of the object to be measured, the CCD image sensor 10 is set to the image surface 10', the value of θ is set as 45 degrees, the imaging lens 9 has a magnification M of 1, and the angle [F] φ is set to 45 degrees. In this arrangement, therefore, the overall the height (thickness) of the substrate surface 7 is kept in focus.

This measuring apparatus 1 uses a light section method as a method for measuring a form. The linear condensed light is perpendicularly radiated onto the substrate surface 7 so that a light section image is formed on the CCD image sensor 10 located obliquely to the travel of the light. Through the image, it is possible to observe the variable heights on the substrate surface 7 such as minute convexes and concaves and differences in level.

Figure 6:
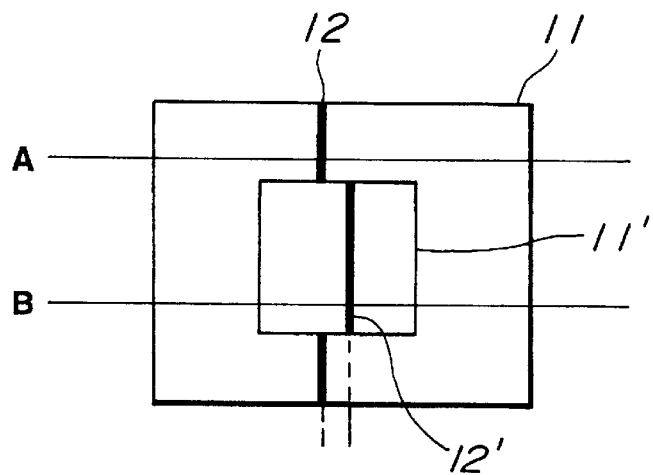
FIG. 6 is a model view showing an image recognized on a CCD image sensor provided in the apparatus for measuring a thickness of solder.

The specific example of an image formed on the CCD image sensor 10 is shown in FIG. 6. The convex and concave light section image on the substrate surface 7 appears on the CCD image sensor 12 as a linear image 12' shifted against the line image 12 on the datum level (herein, the resist plane) 11 as shown in FIG. 6.

The CCD image sensor 10 serves to convert the line images 12 and 12' into video signals. The video signal on the horizontal line A of the datum level is compared with the video signal on the horizontal line B of a convex and concave level 11' by the image processing system. Specifically, the image processing system operates to read the video signal on the horizontal line A of the datum level 11 and the video signal on the horizontal line B of the convex and concave level 11' in a frame memory built in the system itself and process these signals one line by one line.

Figure 7:
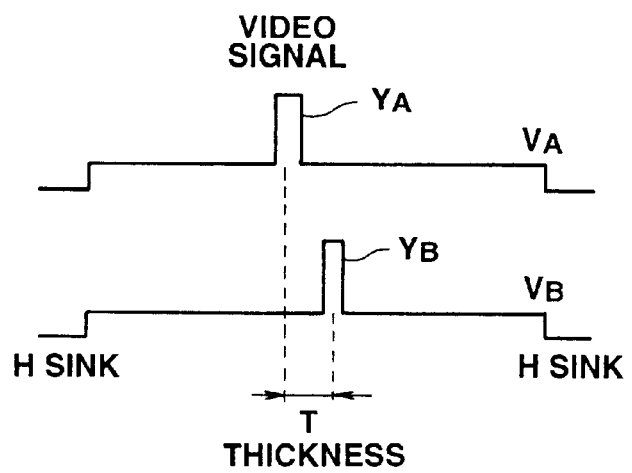
FIG. 7 is a chart showing a waveform of a video signal produced by the apparatus for measuring a thickness of solder.

The image processing system, as shown in FIG. 7, derives as height (thickness) data a time difference T between one luminance peak $Y_A$ on one H line and the other luminance peak $Y_B$ on the other H line. In this embodiment, the image processing system operates to read a number $V_A$ of pixels between the H sink and the peak representing an emission line on the datum level and the number of pixels $V_B$ between a H sink and a peak representing an emission line on the height level of the object to be measured. Then, the system operates to derive a thickness of solder from a difference between $V_A$ and $V_B$ by the effect of the predetermined operation.

This measuring apparatus 1 is allowed to travel on the overall substrate surface 7 that is the object to be measured by an automatic control device so that the apparatus 1 can measure variable thicknesses of the overall solder coated on the substrate surface 7.

Accordingly, the measuring apparatus 1 according to this embodiment enables measurement of the substrate surface 7 in the height (thickness) direction with an accuracy of several tens of μm. The apparatus 1 uses the second harmonic generating element 2 for emitting a laser beam having a wavelength of 532 nm. This element 2 makes it possible to improve a reflectance with respect to the resist component by about 20 dB and an S/N ratio and thereby achieve more exact measurement as compared with the prior art.

Further, the of Scheimpflug Rule is applied to the location of the observing system 8 so that the variable heights of the substrate surface 7 are constantly in conjugation with the image surface of the CCD image sensor 10. Even off the center of the image surface, no defocusing takes place. The change of a line width and strength of the light section image is made smaller than that of the prior art. Hence, the measuring apparatus 1 of this embodiment achieves exact measurement with no degradation of the S/N ratio.

In addition, the apparatus for measuring a surface form according to the present invention is not limited to the apparatus of the foregoing embodiment. A second embodiment of the apparatus for measuring surface form according to the present invention will be described below. This second embodiment concerns with an apparatus for measuring a thickness of solder that is arranged to radiate a laser beam onto the substrate surface on which the cream solder is coated and to measure a thickness of the solder according to a change in the laser beam reflected from the substrate surface.

Figure 8:
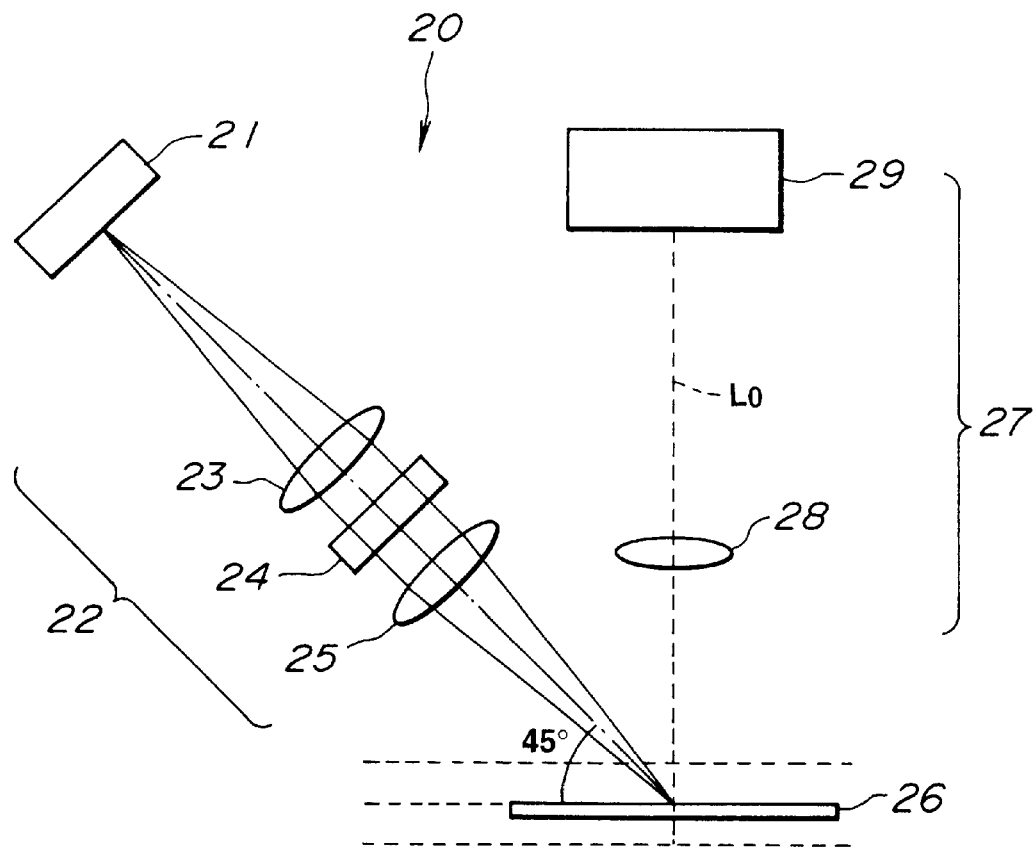
FIG. 8 is a schematic diagram showing an apparatus for measuring a thickness of solder according to a second embodiment of the apparatus for measuring a surface form of the present invention.

As shown in FIG. 8, the apparatus 20 for measuring a thickness of solder according to the second embodiment includes a second harmonic generating element 21 for radiating a laser beam having a wavelength of 532 nm onto a substrate surface 26, an emitting optical system 22 for linearly radiating the laser beam generated by the second harmonic generating element 21 onto the substrate surface 26 at an angle of 45 degrees, and a CCD image sensor 29 located perpendicularly to the substrate surface 26. The emitting optical system 22 provides an observing system 27 for observing a light section image formed of the linear beam radiated onto the substrate surface 26 and an image processing system for performing an image treatment about the light section image observed by the observing system 27.

The emitting optical system 22 is composed of a collimator lens 23 for transforming the laser beam emitted from the second harmonic generating element 21 into a parallel beam, a cylindrical lens 24 for magnifying in one direction the parallel laser beam passed through the collimator lens 23, and a condensing lens 25 for magnifying on the substrate surface 26 the laser beam in the above-indicated one direction, which is sent from the cylindrical lens 24, and condensing on the substrate surface 26 the laser beam in the direction perpendicular to the one direction for magnification.

Further, the observing system 27 is comprised of an imaging lens 28 having a magnification of 4× and an operating distance of 30 to 50 mm and a ⅔-inch-sized CCD image sensor 29. The imaging lens 28 operates to image on the CCD image sensor 29 the laser beam reflected on the substrate surface 26.

The second harmonic generating element 21 has the same structure as the foregoing second harmonic generating element 2. Inside the element 21, a beam expander (not shown) is provided. The laser beam having a wavelength of 532 nm is diffused by the beam expander and then is transformed into the parallel flux by the effect of the collimator lens 23. The laser beam transformed into the parallel flux passes through the condensing lens 24 and the cylindrical lens 25, and then is turned to be a linear laser beam having an NA of about 0.027, a focal depth of 260 $\mu$m in the direction perpendicular to the mounting substrate surface 26, a line width of 35 to 80 $\mu$m in the range of ±0.75 mm from a focal point in the direction perpendicular to the mounting substrate surface 26, and a line length of 3 to 4 mm. The linear laser beam is condensed on the substrate surface 26. The quantity of the laser beam radiated onto the substrate surface 26 is lengthwise 50 $\mu$W/mm in the line width of 35 $\mu$m.

The laser beam reflected on the substrate surface 26 is imaged on the CCD image sensor 29 by the imaging lens 28. The observing system 27 has its optical axis Lo located perpendicularly to the substrate surface 26.

This measuring apparatus 20 uses the light section method as the method for measuring a form. The linearly condensed beam is radiated onto the substrate surface 26 obliquely at an angle of 45 degrees for forming a light section image. The image is formed on the CCD image sensor 29 located perpendicularly to the substrate surface 26. Through the image, it is possible to observe minute convexes and concaves and the variable heights such as differences in level on the actual solder coated on the substrate surface 26.

Figure 9:
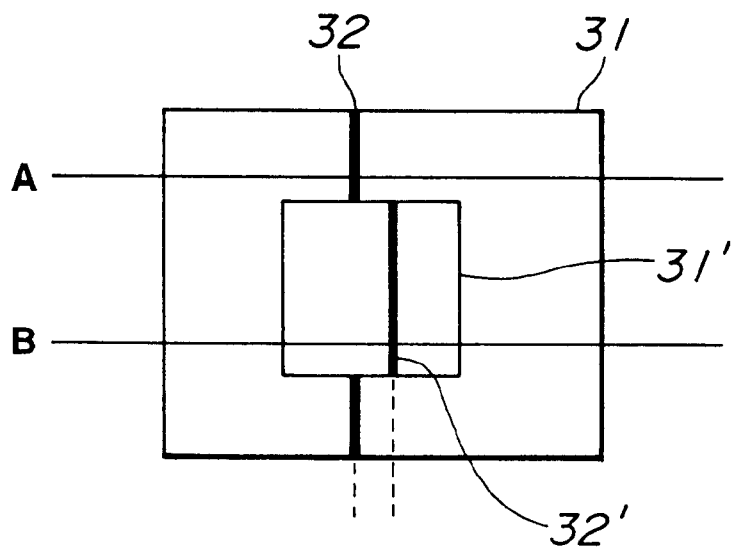
FIG. 9 is a model view showing an image recognized on a CCD image sensor provided in the apparatus for measuring a thickness of solder according to the second embodiment of the present invention.

The specific example of the image formed on the CCD image sensor 29 will be shown in FIG. 9. The light section image of the convexes and concaves of the substrate surface 26 appears on the CCD image sensor 29 as a line image 32'0 horizontally shifted with respect to the line image 32 on the datum level 31 as shown in FIG. 9.

The CCD image sensor 29 operates to convert the line images 32 and 32' into the corresponding video signals. The video signal on the horizontal line A of the datum level 31 is compared with the video signal on the horizontal line B on the convex and concave 31' by the image processing system. Specifically, the image processing system operates to read the video signal on the horizontal line A of the datum level 31 and the video signal on the horizontal line B of the convex and concave level 31' in a frame memory built in the system itself and then process the video signals one line by one line.

Figure 10:
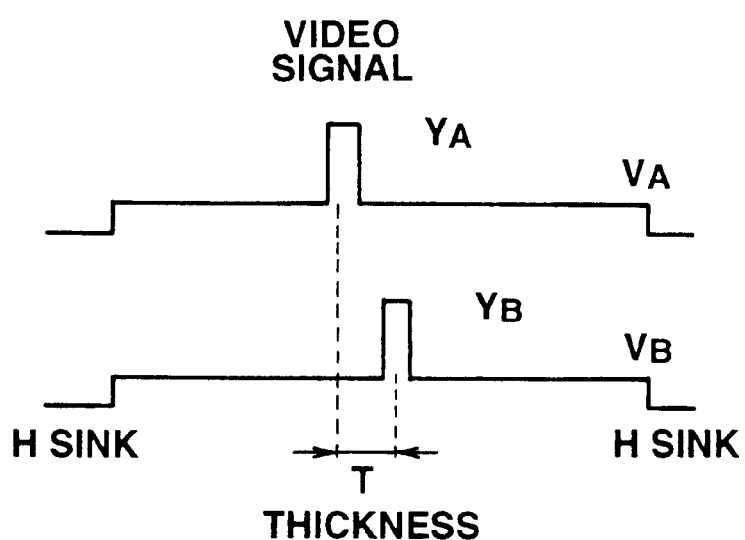
FIG. 10 is a chart showing a waveform of a video signal produced by the apparatus for measuring a thickness of solder according to the second embodiment of the present invention.

The image processing system, as shown in FIG. 10, derives a time difference T between the luminance peaks $Y_A$ and $Y_B$ on the two H lines as height (thickness) data. Like the first embodiment, the image processing system of the second embodiment also operates to read a number $V_A$ of pixels between a H sink on the datum level and a peak representing an emission line and a number $V_B$ of pixels between a H sink on a height level of the object to be measured and a peak representing the emission line. Then, the image processing system performs a predetermined operation of deriving a thickness of solder from a difference between $V_A$ and $V_B$.

This measuring apparatus 20 is allowed to be moved over the overall substrate surface 26, that is, an object to be measured, by an automatic control apparatus (not shown) so that the apparatus 20 can measure variable thicknesses of the overall solder coated on the substrate surface 26. Hence, the measuring apparatus 20 of the second embodiment enables measurement of the substrate surface 26 in the height direction, that is, the thickness of the substrate surface 26 with an accuracy of several tens of $\mu$m.

As mentioned above, the measuring apparatus 20 uses the second harmonic generating element 21 for emitting the laser beam having a wavelength of 532 nm. The use of this element 21 makes it possible to improve a reflectance with respect to the resist component by about 20 dB and an S/N ratio and to achieve more exact measurement as compared with the prior art.

Further, the measuring apparatus 20 is arranged so that the laser beam is obliquely radiated onto the substrate surface 26 and the CCD image sensor 29 for observing the image of the substrate surface 26 is located perpendicularly to the substrate surface 26. Hence, the light section image is magnified on the image surface of the CCD image sensor 29 similarly in the vertical and the horizontal directions and appears at different spots on the image surface of the CCD image sensor 29 according to the variable heights of the substrate surface 26. Hence, this measuring apparatus 20 enables to simplify and speed up the measurement and the image processing. Since the laser beam is obliquely radiated onto the substrate surface 26, even if the CCD image sensor 29 is not used, the light section image can be directly observed by human eyes. That is, as done on the image sensor, the convexes and concaves are allowed to be observed by human eyes.

The apparatus for measuring a surface form according to the present invention may use another light source for emitting a laser beam having a wavelength of 475 to 560 nm in addition to the second harmonic generating element for emitting the second harmonic laser beam having a wavelength of 532 nm. The light source includes an ArII gas laser for emitting a laser beam having a wavelength of 477, 488, 497, 502 or 515 nm or a KrII gas laser for emitting a laser beam having a wavelength of 521 or 531 nm. In place of them, it may be a semiconductor laser for emitting a laser beam having a wavelength of 475 to 560 nm or an LED for emitting a beam having a wavelength of 475 to 560 nm.

The laser power may be adjusted to any value unless it is too large for the video signal representing an emission line to be saturated and for the center of the signal intensity to be out of sensing.

The emitting optical system for linearly condensing the laser beam emitted from the light source onto the object to be measured may use any number of lenses.

In the apparatus for measuring a thickness of solder 1, the locational angle of the optical axis of the imaging lens 9 may be any angle if the emission line of the laser beam formed according to the surface of the object to be measured is not shadowed by the convex portion adjacent to the emission line and the CCD image sensor camera can take a photo of the form of the emission line of the laser beam appearing on the object to be measured.

In the apparatus for measuring a thickness of solder 1, two or more observing systems 8 may be installed symmetrically with respect to the optical axis of the emitting optical system 3.

In the measuring apparatus 20, the locational angle of the optical axis of the emitting optical system may be any angle if the emission line of the laser beam formed according to the surface of the object to be measured is not shadowed by the convex portion adjacent to the emission line and the CCD image sensor can take a photo of the form of the emission line of the laser beam on the object to be measured.

In the imaging lens of the observing system, the operating distance and the magnification may be any value if they meet the performance and the size of the overall apparatus.

The size of the CCD image sensor is not limited to ⅔ inch.

In place of the CCD image sensor, a CCD image line sensor or an optical location sensor may be used.

Moreover, the apparatus for measuring a surface form according to the present invention may be applied to an apparatus for inspecting a mounting substrate that inspects the mounting state of a circuit board on which components are mounted. It may be also applied to an apparatus for inspecting a mounting component that measures a form or a thickness of a single minute component such as a chip capacitor or a chip resistor not to be mounted on the circuit board.

What is claimed is:

1. An apparatus for measuring solder thickness on a surface to be measured, comprising:
    a light source;
    an optical system configured to transmit light from the light source to the surface to be measured with the solder as a beam of light with a wavelength of less than 560 nm;
    observing means having (1) an optical axis oriented in a direction that is different than that of an optical axis of the optical system and (2) a two-dimensional image sensor located to receive light reflected from the surface to be measured; and
    image processing means operatively coupled to the observing means for measuring the thickness of the solder based on image signals generated by the observing means.

2. The apparatus of claim 1, wherein the beam of light was a wavelength from 475 to 560 nm.

3. The apparatus of claim 1, wherein the observing means includes an imaging lens that condenses the light reflected from the surface to be measured onto an image surface of the two-dimensional image sensor so that an axis $L_I$ of the beam of light as it reaches the surface to be measure, a line $L_P$ perpendicular to an optical axis $L_O$ of the imaging lens, and a line $L_Q$ extending along a plane of the image surface of the two-dimensional image sensor intersect at one point.

4. The apparatus of claim 1, wherein the light source includes:
    a semiconductor laser element;
    a solid laser excited by a laser beam emitted by the semiconductor laser element; and
    a non-linear optical crystalline element located in a resonator.

5. The apparatus of claim 1, wherein the optical system includes:
    a collimator lens that transforms the light beam emitted by the light source into a parallel light flux;
    a cylindrical lens that magnifies in one direction a diameter of the parallel light flux from the collimator lens; and
    a condensing lens that condenses light from the cylindrical lens.

6. The apparatus of claim 1, wherein the imaging lens has a magnification of 4× and an operating distance of 30 to 50 nm.

7. The apparatus of claim 3, wherein an angle θ formed by line Li and optical axis Lo is related to an angle Φ formed by lines $L_P$ and $L_Q$ as follows:

TAN θ=$M$/TAN Φ, where M is the typification of the imaging lens.

8. An apparatus for measuring solder thickness on a surface to be measured, comprising:
    a light source;
    an optical system that receives light from the light source and directs a beam of light with a wavelength in the range of 470 to 560 nm obliquely onto the surface to be measured so that the beam of light is linear on the surface to be measured;
    observing means having a two-dimensional image sensor located perpendicularly to a height direction of the surface to be measured and which receives an image formed by light reflected from the surface to be measured; and
    an image processor operatively in communication with the observing means, the image processor generating a measurement of the solder thickness based on signals generated by the two-dimensional image sensor.

9. The apparatus of claim 8, wherein the observing means includes an imaging lens operatively positioned between the two-dimensional image sensor and the surface to be measured, and the imaging lens has a magnification of 4× and an operating distance of 30 to 50 nm.

10. The apparatus of claim 8, wherein the observing means includes an imaging lens that condenses the light reflected from the surface to be measured onto an image surface of the two-dimensional image sensor so that the a axis of the beam of light as it reaches surface to be measured, a line $L_P$ perpendicular to an optical axis $L_O$ of the imaging lens, and a line $L_Q$ extending along a plane of the image surface of the two-dimensional image sensor intersect at one point.

11. The apparatus of claim 8, wherein the light source includes:
    a semiconductor laser element;
    a solid laser excited by a laser beam emitted by the semiconductor laser element; and
    a non-linear optical crystalline element located in a resonator.

12. The apparatus of claim 8, wherein an angle θ formed by line Li and optical axis $L_O$ is related to an angle Φ formed by lines $L_P$ and $L_Q$ as follows:

TAN θ=$M$/TAN Φ, where M is the magnification of the imaging lens.

13. An apparatus for measuring features on a circuit board, comprising:
    a laser;
    an optic system operatively positioned and configured to transmit the light from the laser onto the circuit board as a beam of light with a wavelength in the range of 470 to 560 nm;
    an image sensor capable of resolving images in two dimensions and operatively positioned to receive light reflected from the circuit board;
    an imaging lens operatively positioned between the circuit board and the image sensor to condense the light reflected from the circuit board before it reaches the image sensor; and
    an image processor operatively in communication with the image sensor and configured to generate measurement of height of features on the circuit board based on signals generated by the image sensor,
    wherein,
    an axis $L_I$ of the beam of light a line $L_P$ perpendicular to an optical axis $L_O$ of the imaging lens and a line $L_Q$ extending along a plane of an imaging surface of the image sensor intersect at one point.

14. The apparatus of claim 13, wherein an angle θ formed by line Li and optical axis $L_O$ is related to an angle Φ formed by lines $L_P$ and $L_Q$ as follows:

TAN θ=$M$/TAN Φ, where M is the magnification of the imaging lens.

15. The apparatus of claim 13, wherein the optical system includes:

a collimator lens that transforms the light beam emitted by the light source into a parallel light flux;

a cylindrical lens that magnifies in one direction a diameter of the parallel light flux from the collimator lens; and a condensing lens that condenses light from the cylindrical lens.

16. The apparatus of claim 13, wherein the imaging lens has a magnification of 4× and an operating distance of 30 to 50 nm.

* * * * *